United States Patent
Gu

(10) Patent No.: US 11,725,806 B2
(45) Date of Patent: Aug. 15, 2023

(54) PHOTOGRAPHY LAMP

(71) Applicant: APUTURE IMAGING INDUSTRIES CO., LTD., Guangdong (CN)

(72) Inventor: Haijun Gu, Guangdong (CN)

(73) Assignee: APUTURE IMAGING INDUSTRIES CO., LTD., Guangdong (CN)

( * ) Notice: Subject to any disclaimer, the term of this patent is extended or adjusted under 35 U.S.C. 154(b) by 101 days.

(21) Appl. No.: 17/646,527

(22) Filed: Dec. 30, 2021

(65) Prior Publication Data

US 2023/0066831 A1 Mar. 2, 2023

(30) Foreign Application Priority Data

Sep. 2, 2021 (CN) .......................... 202111027780.5

(51) Int. Cl.
*F21V 17/18* (2006.01)
*F21W 131/406* (2006.01)

(52) U.S. Cl.
CPC ....... *F21V 17/18* (2013.01); *F21W 2131/406* (2013.01)

(58) Field of Classification Search
CPC .. G03B 2215/0517–0553; G03B 15/02; G03B 15/06; F21V 17/002; F21W 2131/406
USPC ................................................ 403/325, 327
See application file for complete search history.

(56) References Cited

U.S. PATENT DOCUMENTS

2010/0124068 A1  5/2010 Karle

FOREIGN PATENT DOCUMENTS

| CN | 208095048 U | 11/2018 | |
|---|---|---|---|
| CN | 208325033 U | 1/2019 | |
| CN | 212081150 U | 12/2020 | |
| CN | 113093452 A | 7/2021 | |
| DE | 102011052394 A1 * | 10/2012 | ............... F21V 7/18 |
| WO | WO-2019168534 A1 * | 9/2019 | |

OTHER PUBLICATIONS

The First Office Action and Search Report dated Oct. 13, 2021, for Aputure Imaging Industries Co., Ltd., from China Application No. 202111027780.5 and Its Translation of Office Action Into English (6 pages).

* cited by examiner

*Primary Examiner* — Andrew J Coughlin
*Assistant Examiner* — Steven Y Horikoshi

(57) ABSTRACT

The present disclosure provides a photography lamp. The photography lamp includes a front housing, an ejector rod, a bracket, and a limiting structure. An accessory slot with a through-hole is arranged on a side of the front housing, the ejector rod is movably arranged into the through-hole, the bracket is arranged on another side of the front housing away from the accessory slot The photography lamp provided by the present disclosure can be operated conveniently. When the accessory is installed on the video lamp, the bracket is not susceptible to interference from the accessory of the photography lamp.

13 Claims, 6 Drawing Sheets

PHOTOGRAPHY LAMP

CROSS REFERENCE TO RELATED APPLICATION

This disclosure claims priority to Chinese Patent Disclosure Number 202111027780.5 filed Sep. 2, 2021, the disclosures of which are incorporated in their entirety by reference herein.

FIELD OF INVENTION

The present disclosure relates to lighting technology, and in particular to a photography lamp.

BACKGROUND OF INVENTION

In the case of shooting videos, TV series and photos, etc., soft boxes, hoods and other accessories are usually installed on the light-emitting side of a photography lamp to fill or illuminate the subject or scene. Furthermore, the photography lamp and accessories are usually connected by a Bowens Mount. An ejector mechanism is arranged in the photography lamp. When the accessories are detachably installed on the light emitting side of the photography lamp through the Bowens Mount, the accessories are limited and locked by an ejector rod of the ejector mechanism to avoid falling off from the photography lamp. After that, a pushing portion of the ejector mechanism can be manually pushed to drive the ejector rod to slide relatively to the photography lamp, so that release the locking of the ejector to the accessories and the accessories can be easily detached from the photography lamp.

However, in the prior art, the pushing portion of the ejector mechanism is generally closer to Bowens Mount. As the size of the photography lamp and accessories becomes larger and larger, it is easy to be interfered by the accessories when pushing the ejector rod to slide, which leads to the inconvenience of pushing the ejector rod to slide.

SUMMARY OF INVENTION

The present disclosure provides a photography lamp, which aims to solve the problem that the existing photography lamp is easily interfered by the accessories installed on the photography lamp when the pushing rod is pushed to slide and the operation of pushing the ejector rod to slide is inconvenient.

An embodiment of the present disclosure provides a photography lamp comprising:

a front housing provided with an accessory slot on a side, wherein the accessory slot is provided with a through-hole;

an ejector rod movably arranged in the through-hole, a bracket arranged on another side of the front housing away from the accessory slot; and a limiting structure arranged on the side of the front housing where the bracket are arranged, wherein a first end of the bracket is connected with the ejector rod, a second end of the bracket extends from the accessory slot to an edge of the front housing, the limiting structure is located between the first end and the second end of the bracket and slidably connected to the bracket, and the second end of the bracket is used to receive the external force input by the user to drive the ejector rod to slide relative to the through-hole.

In the photography lamp provided in the embodiment of the present disclosure, the first end of the bracket is connected with the ejector rod, the second end of the bracket extends from the accessory slot to an edge of the front housing, wherein the limiting structure arranged on another side of the front housing away from the accessory slot is slidably connected to the bracket. Users can input an external force to the second end of the bracket to drive the ejector rod to slide relative to the through hole, which is not easy to be interfered by the accessories or other structures installed on the photography lamp. And the users can more conveniently control the second end of the bracket.

DESCRIPTION OF DRAWINGS

In order to explain the technical solutions and beneficial effects of the present disclosure more clearly, the description of embodiments is explained hereinafter with reference to the diagrammatic drawings.

Figure 1:
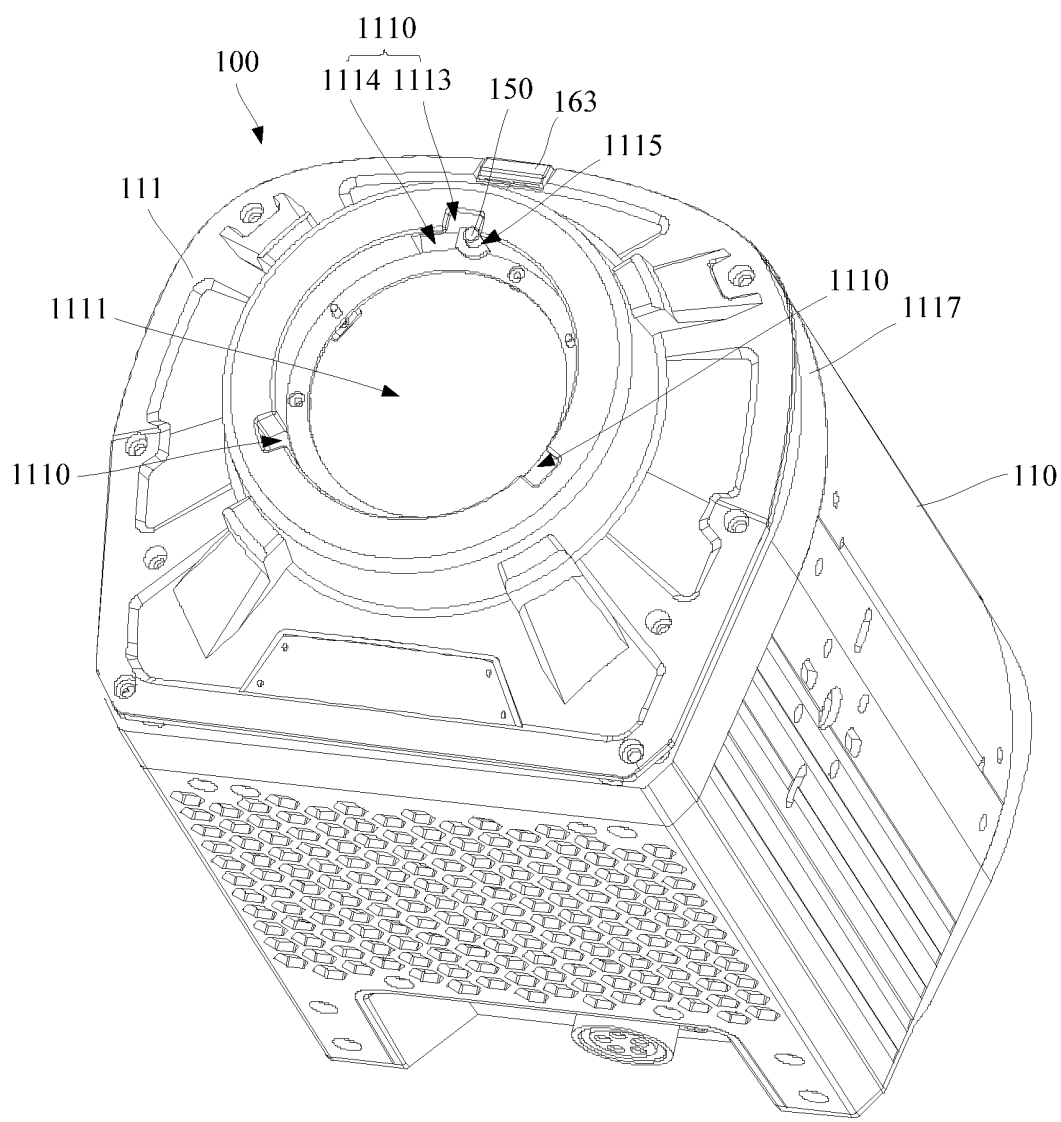
FIG. 1 is a schematic diagram showing a structure of a photography lamp provided by an embodiment of the present disclosure.

Photography lamp 100; housing assembly 110; front housing 111; accessory slot 1110; light-transmitting hole 1111; limiting structure 1112; position-limiting sliding groove 11121; protruding column 11122; mounting slot 1113; bayonet 1114; through-hole 1115; pushing sliding groove 1116; operating hole 11161; side surface 1117; first sliding rod 1118; first connecting post 1119; fifth fixing hole 1120; second sliding rod 1121; fourth fixing hole 1122; first limiting member 130; sixth fixing hole 131; second limiting member 140; guide hole 141; third fixing hole 142; ejector rod 150; free end 151; connecting end 152; first limiting portion 153; threaded hole 154; second limiting portion 155; bracket 160; connecting hole 1611; driving rod 162; pushing rod 1621; tilting rod 1622; connecting rod 1623; pushing portion 163; clamping groove 1631; second fixing hole 1632; first sliding portion 164; first sliding hole 1641; position-limiting groove 1642; second sliding portion 165; second sliding hole 1651; clamping portion 166; first fixing hole 1661; first elastic member 170; second elastic member 180; third elastic member 190.

DETAILED DESCRIPTION OF PREFERRED EMBODIMENTS

The following content combines with the drawings and the embodiment for describing the present disclosure in detail. The same or similar reference numerals indicate the same or similar elements or elements with the same or similar functions It is obvious that the following embodiments are only some embodiments of the present invention, but should not be understood as a limitation to the present disclosure.

In the description of the present disclosure, it is to be understood that the orientation or positional relationship indicated by the terms such as "center", "portrait", "landscape", "length", "width", "thickness", "up", "down", "front", "behind", "left", "right", "vertical", "horizontal", "top", "bottom", "inner", "outer", "clockwise", "counter-clockwise" etc. is based on the orientation or positional relationship shown in the drawings, and is only for convenience of description of the present disclosure and simplified description, which is not indicating or implying that the device or component referred to must have a particular orientation, constructed, and operated in a particular orientation, thus it is not to be construed as limiting the present disclosure. Furthermore, the terms "first", "second", "third" and the like used solely for distinguishing the description, but are not to be construed as indicating or implying relative importance. Thus, features defining "first" or "second" may include one or more of the described features either explicitly or implicitly. In the description of the present disclosure, unless otherwise specified, the meaning of "a plurality" and "multiple" is two or more.

In the description of the present disclosure, unless otherwise specifically defined and limited, the terms "arranged" and "connected" are to be understood broadly, for example, it may be a fixed connection, a detachable connection, or an integration, and it may be a mechanical connection or an electrical connection. The specific meaning of the above terms in the present disclosure can be understood based on a specific case by those skilled in the art.

In the present disclosure, unless otherwise specifically specified and defined, the first feature being "on" or "under" the second feature may include direct contact of the first feature and second feature, and may also include a case where the first feature is not directly contacted with the second feature, but is contacted with the second feature through additional features between them. Moreover, the first feature being "on top of", "above" or "on the surface of" the second feature includes that the first feature is right above or obliquely above the second feature, or merely indicates that the first feature level is higher than the second feature. The first feature being "at the bottom of", "below" or "under" the second feature includes a case where the first feature is directly below and obliquely below the second feature, or merely indicates that the first feature level is less than the second feature.

In the present disclosure, unless otherwise specifically specified and defined, the first feature being "on" or "under" the second feature may include direct contact of the first feature and second feature, and may also include a case where the first feature is not directly contacted with the second feature, but is contacted with the second feature through additional features between them. Moreover, the first feature being "on top of", "above" or "on the surface of" the second feature includes that the first feature is right above or obliquely above the second feature, or merely indicates that the first feature level is higher than the second feature. The first feature being "at the bottom of", "below" or "under" the second feature includes a case where the first feature is directly below and obliquely below the second feature, or merely indicates that the first feature level is less than the second feature.

Embodiments of the present disclosure are described in detail below, examples of which are illustrated in the accompanying drawings, wherein the same or similar reference numerals indicate the same or similar elements or elements with the same or similar functions. The embodiments described below with reference to the drawings are exemplary only and are not to be construed as limiting the present disclosure. In addition, the present disclosure may repeat reference numerals and/or reference letters in different examples. Such repetition is for the purpose of simplification and clarity, and does not indicate the relationship between the various embodiments and/or settings discussed. In addition, this disclosure provides examples of various specific processes and materials, but those of ordinary skill in the art may be aware of other processes and/or the use of other materials.

The embodiment of the present disclosure provides a photography lamp 100 and a housing assembly 110. Detailed descriptions are given hereinafter.

FIG. 1 is a schematic diagram showing a structure of a photography lamp 100 provided by an embodiment of the present disclosure. As shown in FIG. 1, a photography lamp 100 comprises a housing assembly 110 and a light-emitting assembly (not shown in the drawings).

The housing assembly 110 is provided with a mounting cavity (not shown in the drawings), and the light-emitting assembly is installed in the mounting cavity of the housing assembly 110. Wherein, the housing assembly 110 includes a front housing 111. A light-transmitting hole 1111 is formed on the front housing 111, and a light-emitting side of the light-emitting assembly is provided toward the light-transmitting hole 1111, so that the light emitted by the light-emitting assembly is emitted from a front side of the photography lamp 100 through the light-transmitting hole 1111.

An accessory slot 1110 which can be detachably connected with any of the accessories (not shown in the drawings) such as a lens group, a soft box, a light shield, and a standard cover is arranged on the front side of the housing assembly 110. It can be understood that every accessory is provided as a male connecter with a socket, and the accessory slot 1110 is provided as a female connecter, so that different types of accessories can be changed onto the photography lamp 100 according to different usage scenarios.

Wherein, as shown in FIG. 1, the front housing 111 is provided with the accessory slot 1110 on a side, and the accessory slot 1110 is used to connect with the accessory of the photography lamp 100 so that the accessory can be installed onto the photography lamp 100. The accessory slot 1110 comprises a mounting slot 1113 arranged on the side of the front housing 111 and a bayonet 1114 arranged on the inner surface of the mounting slot 1113.

In order to install the accessory onto the photography lamp 100, a clamping protrusion is disposed on the accessory at a position corresponding to each mounting slot 1113. When the accessory needs to be installed on the photography lamp 100, users can insert the clamping protrusion of the accessory into the mounting slot 1113 corresponding to the accessory slot 1110 of the photography lamp 100 and then rotate the accessory to make the clamping protrusion of the accessory click into the bayonet 1114 on the side of the mounting slot 1113. The operation is very convenient. Wherein a plurality of accessory slots 1110 are arranged on the front housing 111, and the plurality of accessory slots 1110 are distributed around the light-transmitting hole 1111.

Figure 2:
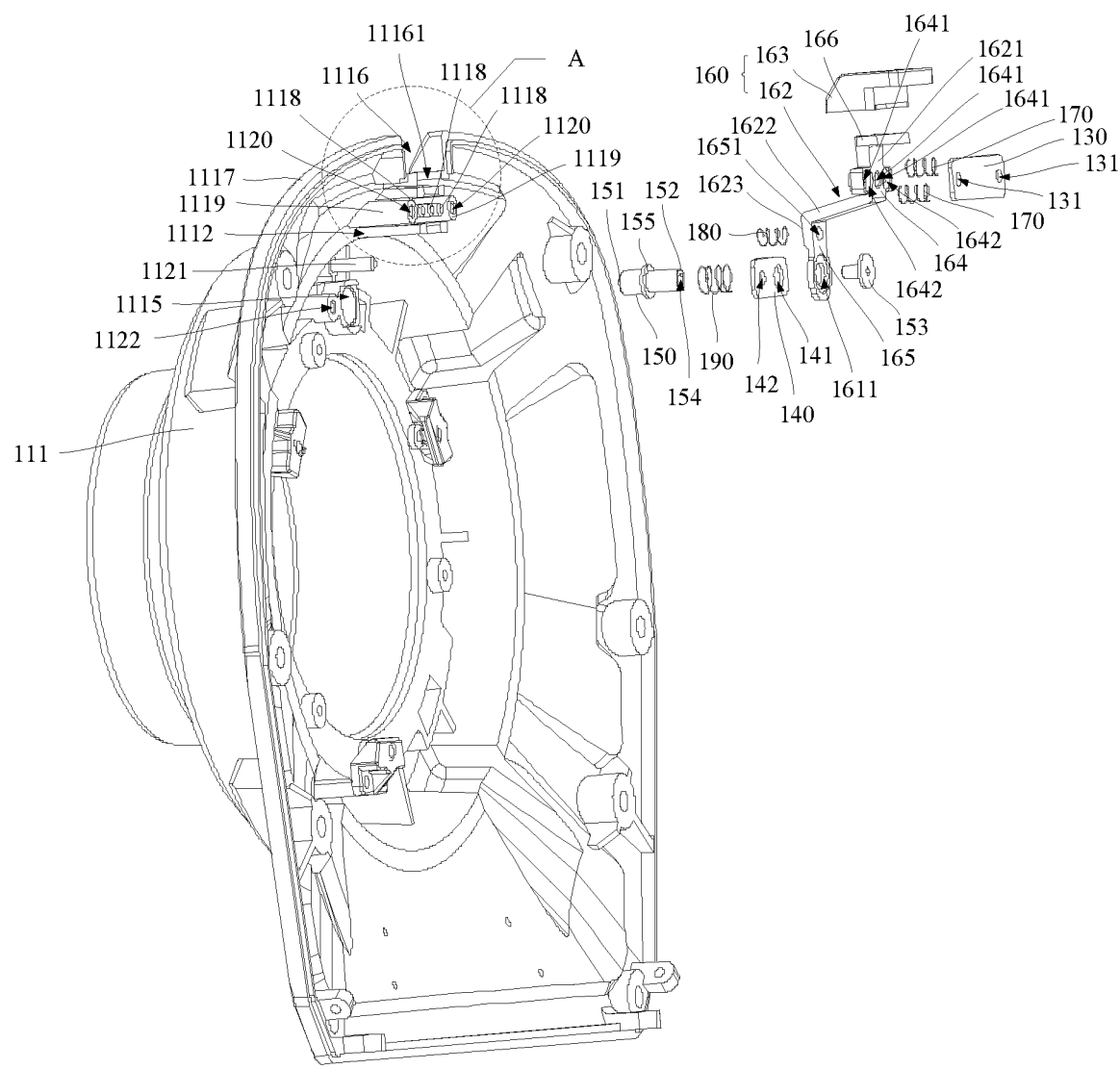
FIG. 2 is a schematic diagram showing an exploded structure of a front housing and a bracket provided by an embodiment of the present disclosure.

As shown in FIGS. 1 and 2, a through-hole 1115 is arranged in the accessory slot 1110. An ejector rod 150 is movably arranged in the through-hole 1115. In a condition that the clamping protrusion of the accessory is inserted into the corresponding accessory slot 1110 on the photography lamp 100, the ejector rod 150 can be controlled to move in the through-hole 1115 to lock the clamping protrusion by the ejector rod 150. The clamping protrusion of the accessory is prevented from coming out of the accessory slot 1110, and the connection between the accessory and the photography lamp 100 is more stable.

Specifically, the through-hole 1115 is opened on the bottom surface of the mounting slot 1113 of the accessory slot 1110 and penetrates the front housing 111. In a condition that the clamping protrusion of the accessory is inserted into the corresponding accessory slot 1110 on the photography lamp 100, the ejector rod 150 is squeezed by the clamping protrusion and retracted into the through-hole 1115 along the direction of the front housing 111 away from the accessory slot 1110 to avoid the clamping protrusion. In a condition that the accessory is rotated to make the clamping protrusion of the accessory lock into the bayonet 1114 on the side of the mounting slot 1113, the ejector rod 150 can be extended into the accessory slot 1110 to hold the clamping protrusion in the accessory slot 1110. The clamping protrusion is prevented from coming out of the bayonet 1114, and the connection between the accessory and the photography lamp 100 is more stable.

Figure 3:
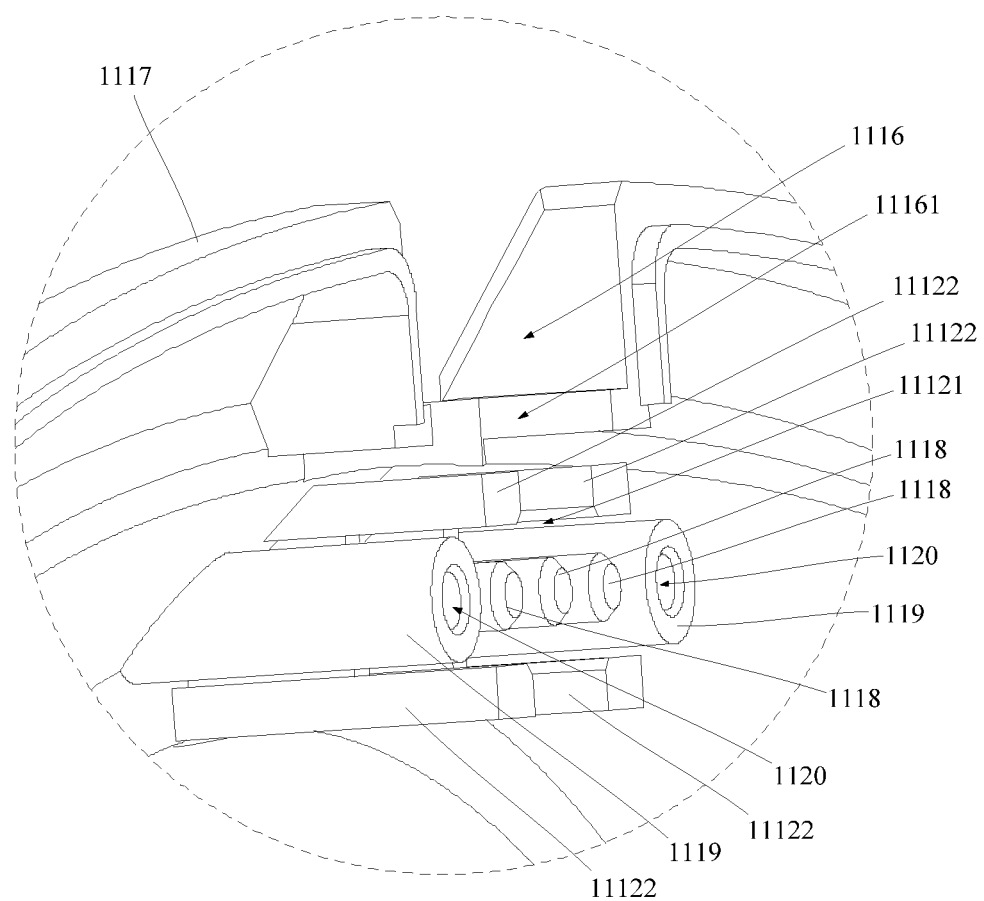
FIG. 3 is an enlarged view of part A in FIG. 2.
Figure 6:
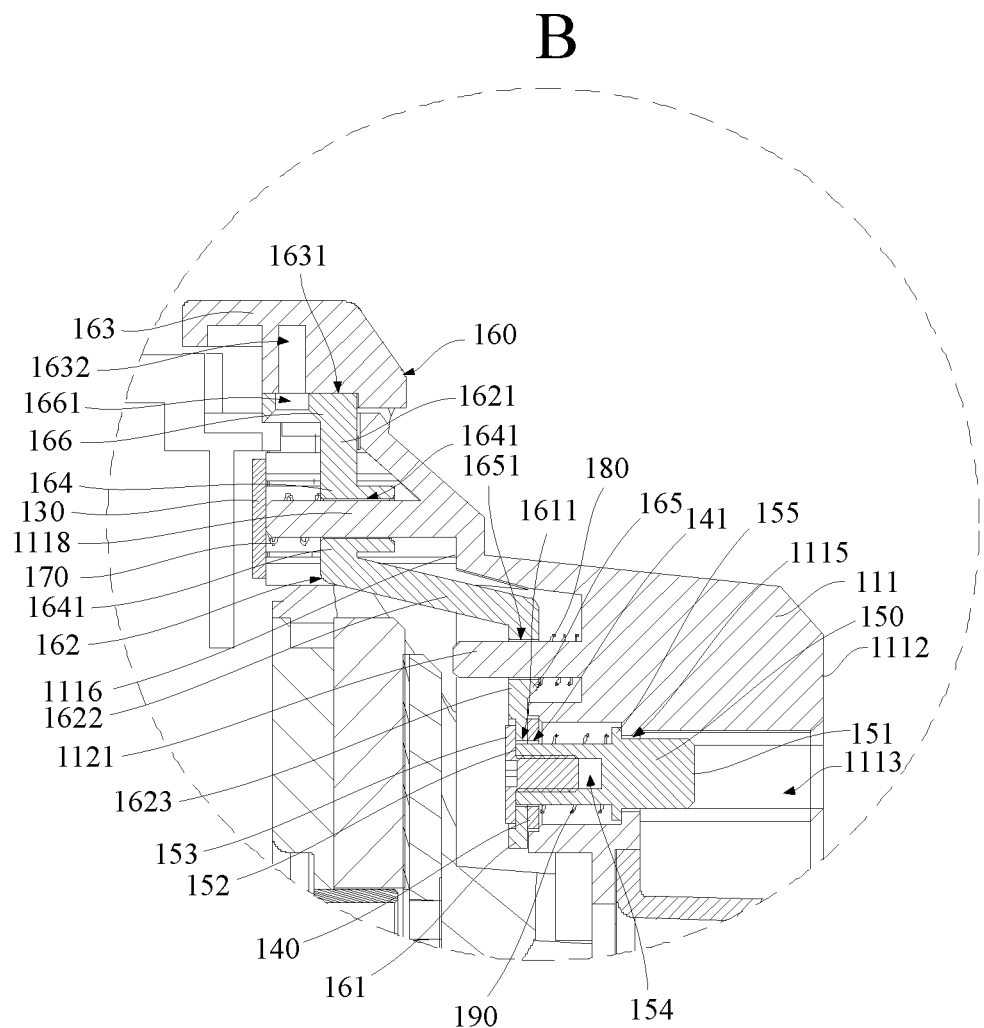
FIG. 6 is an enlarged view of part B in FIG. 4.

As shown in FIGS. 2, 3 and 6, the photography lamp 100 further comprises a bracket 160 and a limiting structure 1112. The bracket 160 is arranged on another side of the front housing 111 away from the accessory slot 1110. A first end of the bracket 160 is connected to the ejector rod 150, and a second end of the bracket 160 extends from the accessory slot 1110 to an edge of the front housing 111. The limiting structure 1112 is arranged on the same side of the front housing 111 where the bracket 160 is arranged.

The limiting structure 1112 is located between the first end and the second end of the bracket 160 and slidably connected to the bracket 160. Therefore, the second end of the bracket 160 is used to receive the external force input by the user to drive the ejector rod 150 to slide relative to the through-hole 1115, so that the ejector rod 150 slides to a position where the clamping protrusion of the accessory is locked, or to the position where the clamping protrusion of the accessory is unlocked.

In the embodiment of the present disclosure, the first end of the bracket 160 is connected to the ejector rod 150, and the second end of the bracket 160 extends from the accessory slot 1110 to the edge of the front housing 111, and the limiting structure 1112 arranged on the side of the front housing 111 away from the accessory slot 1110 is slidably connected to the bracket 160. The user can drive the ejector rod 150 to slide relative to the through-hole 1115 by inputting an external force to the second end of the bracket 160, which is not easy to be interfered by the accessory or other structures installed on the photography lamp 100. The user can operate the second end of the bracket 160 more conveniently.

In a condition that the limiting structure 1112 is slidably connected to the bracket 160, the user can apply an external force to the second end of the bracket 160. A direction of action of the external force is along the front housing 111 away from the accessory slot 1110 to make the ejector rod 150 slide along the direction of the front housing 111 away from the accessory slot 1110 with the bracket 160, so as to release the locking state of the clamping protrusion by the ejector rod 150.

As shown in FIG. 3, the limiting structure 1112 comprises a position-limiting sliding groove 11121. The position-limiting sliding groove 11121 extends along the front housing 111 away from the accessory slot 1110. Wherein a first sliding portion 164 that matched with the position-limiting sliding groove 11121 is arranged between the first end and the second end of the bracket 160. The first sliding portion 164 is slidably installed in the position-limiting sliding groove 11121 to make the limiting structure 1112 slidably connected with the bracket 160 more stably.

Specifically, the limiting structure 1112 comprises a plurality of protruding columns 11122 connected to the side of the front housing 111 away from the accessory slot 1110. The plurality of protruding columns 11122 are arranged in parallel. The position-limiting sliding groove 11121 is located between the plurality of protruding columns 11122. In a condition that the first sliding portion 164 of the bracket 160 of is slidably installed in the position-limiting sliding groove 11121, the first sliding portion 164 is restricted by the plurality of protruding columns 11122, so that the bracket 160 slides along the extending direction of the protruding columns 11122. Wherein the protruding columns 11122 extend along the front housing 111 away from the accessory slot 1110 to make the bracket 160 to drive the ejector rod 150 to slide along the front housing 111 away from the accessory slot 1110.

In other embodiments, the limiting structure 1112 comprises a plurality of limiting boards (not shown in the drawings) connected to the side of the front housing 111 away from the accessory slot 1110. The plurality of limiting boards extend along the front housing 111 away from the accessory slot 1110, and the position-limiting sliding groove 11121 is formed by enclosing via the plurality of limiting boards.

Wherein, the plurality of limiting board may be provided with intervals between them, or may be connected to each other as a whole. After the first sliding portion 164 of the bracket 160 is slidably installed in the position-limiting sliding groove 11121 enclosed via the plurality of limiting boards, the plurality of limiting boards slidably abut against the side surface 1117 of the first sliding portion 164, so that the bracket 160 to make the bracket 160 to drive the ejector rod 150 to slide along the front housing 111 away from the accessory slot 1110.

Optionally, the photography lamp 100 further comprises a first elastic member 170, one end of the first elastic member 170 is connected to the front housing 111, and another end of the first elastic member 170 is connected to the bracket 160 to apply a first elastic force to the bracket 160 to make the bracket 160 slide along the along the front housing 111 toward the accessory slot 1110.

Therefore, when the user applies an external force to the second end of the bracket 160, the ejector rod 150 slides with the bracket 160 along the front housing 111 away from the accessory slot 1110 to release the clamping protrusion of the accessory locked by the ejector rod 150, and the user can remove the accessory from the photography lamp 100. After the user releases his hand, the bracket 160 will automatically slide to the limit position along the front housing 111 toward the accessory slot 1110 under the action of the first elastic member 170 to keep the ejector rod 150 in the location locked the clamping protrusion of the accessory.

Wherein, the first elastic member 170 includes springs, tensile force springs, torsion springs, rubber, elastic pieces, etc., as long as the first elastic force can be applied to the bracket 160 to make the bracket 160 slide along the front housing 111 toward the accessory slot 1110. There is no limitation herein.

In addition, the elastic force exerted by the first elastic member 170 on the bracket 160 can be a thrust force or a tensile force, as long as the bracket 160 can slide along the direction from the free end 151 of the ejector rod 150 to the connecting end 152. There is no limitation herein.

As shown in FIG. 2 and FIG. 3, the limiting structure 1112 comprises one or more first sliding rods 1118, an end of at least one of the one or more first sliding rods 1118 is connected to the side of the front housing 111 away from the accessory slot 1110. At least one first sliding hole 1641 is arranged on the first sliding portion 164. At least one of the one or more first sliding rods 1118 is inserted into a corresponding first sliding hole 1641 of the at least one sliding hole and slidably connected with the first sliding portion 164, so that the first sliding portion 164 is slidably connected with the front housing 111 more stably.

Wherein, the cross-sectional shape of the first sliding rod 1118 is a circle, a rectangle, etc., which is not limited here. Correspondingly, the cross-sectional shape of the first sliding hole 1641 is circular, rectangular, etc., and as long as the first sliding rod 1118 can be slidably fitted with the first sliding hole 1641.

In other embodiments, a first sliding rail (not shown in the drawings) is provided on the rear surface of the front housing 111. The first sliding rail extends along the direction of the front housing 111 away from the accessory slot 1110. The first sliding portion 164 of the bracket 160 is slidably installed on the first sliding rail, so that the bracket 160 is connected to the front housing 111 more stably.

Figure 4:
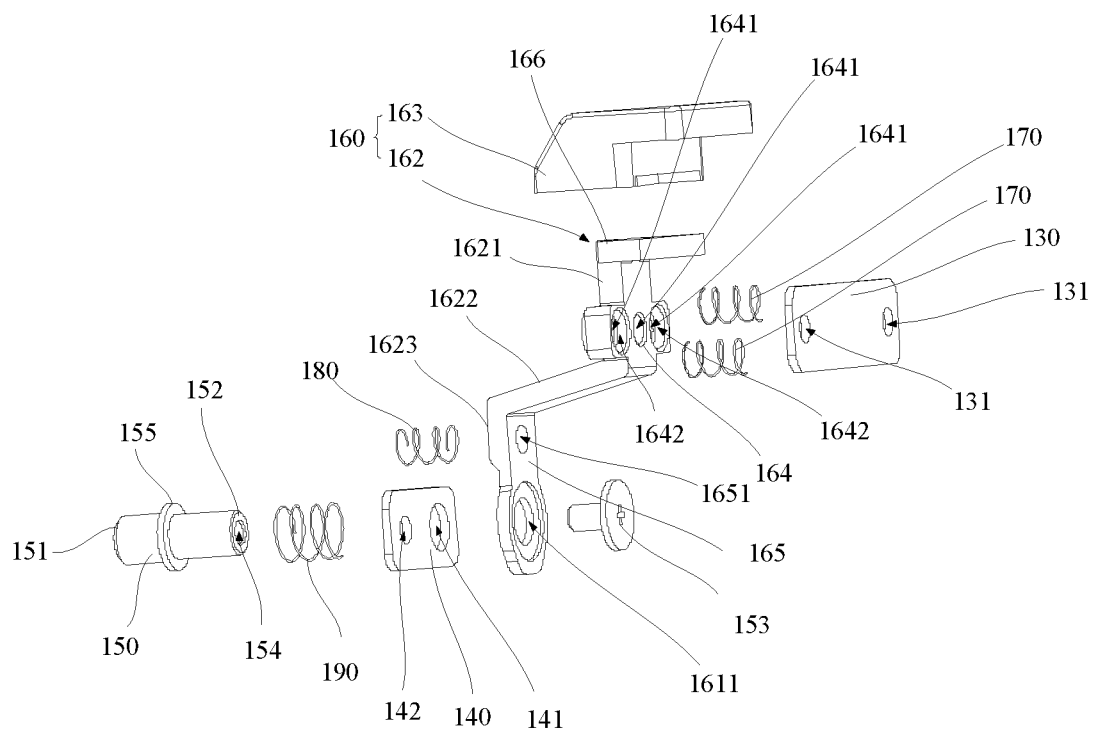
FIG. 4 is a schematic diagram showing the mechanism of an ejector rod and the bracket in FIG. 2.

Optionally, as shown in FIGS. 4 and 6, the first elastic member 170 is located on the side of the first sliding portion 164 away from the front housing 111. One end of the first elastic member 170 abuts on the front housing 111, and another end of the first elastic member 170 abuts on the first sliding portion 164 to apply a first elastic force to the bracket 160. Wherein, the first elastic force exerted by the first elastic member 170 on the bracket 160 is a thrust force.

Wherein, a first limiting member 130 is arranged on the front housing 111, and the first limiting member 130 is located at a side of the first sliding portion 164 away from the front housing 111 and connected to the front housing 111. The first elastic member 170 is located between the first sliding portion 164 and the first limiting member 130, one end of the first elastic member 170 abuts on the first limiting member 130, and another end of the first elastic member 170 abuts on the first sliding portion 164 to apply a first elastic force to the bracket 160. The first limiting member 130 is used to cooperate with the limiting structure 1112 to form a limiting space to realize the limiting and fixing of the bracket 160 in the limiting structure 1112, and the bracket 160 is effectively prevented from coming out from the limiting structure 1112.

In the embodiment of the present disclosure, the first elastic member 170 is disposed between the first limiting member 130 and the first sliding portion 164, wherein one end of the first elastic member 170 abuts on the first limiting member 130, and another end of the first elastic member 170 abuts on the first sliding portion 164, so that the first elastic force applied by the first elastic member 170 to the first sliding portion 164 is more stable.

Optionally, a position-limiting groove 1642 is arranged on the surface of the first sliding portion 164 facing the first limiting member 130, and one end of the first elastic member 170 abuts against the bottom surface of the position-limiting groove 1642. Therefore, the position of end of the first elastic member 170 that abuts on the first sliding portion 164 can be limited by the side wall of the position-limiting groove 1642, and the end of the first elastic member 170 that abuts on the first sliding portion 164 is prevented sliding on the surface of the first sliding portion 164 facing the first limiting member 130. The stability of the abutment between the end of the first elastic member 170 and the first sliding portion 164 is improved.

Optionally, the first sliding rods 1118 is provided passing through the corresponding first sliding hole 1641 and protruding from a side of the first sliding portion 164 facing to the first limiting member 130, and the first elastic members 170 is sleeved on the corresponding first sliding rod 1118 to make the installation of the first elastic member 170 is more stable.

Optionally, the first limiting member 130 is detachably connected to the front housing 111 to make the installation of the first elastic member 170 and the driving rod 162 more convenient. Wherein, the first limiting member 130 and the front housing 111 can be detachably connected by screw, snap, or the like.

Specifically, the first limiting member 130 is provided in a plate shape. The side surface 1117 of the first limiting member 130 is opposite to an end of the first sliding rod 1118 along the front housing 111 away from the accessory slot 1110. Two first connecting post 1119 are provided on the side of the front housing 111 away from the accessory slot 1110 in a protruding manner. The end surfaces of the two first connecting posts 1119 are provided with fifth fixing holes 1120. The first limiting member 130 defines two sixth fixing holes 131 penetrating through the position corresponding to the two first connecting posts 1119. The housing assembly 110 also includes two first fasteners (not shown in the drawings), and the two first fasteners are inserted into the two fifth fixing holes 1120 through the two sixth fixing holes 131 respectively to connect the first limiting member 130 and the two first connecting posts 1119 together. Wherein the first fasteners are screws.

In other embodiments, the first limiting member 130 and the front housing 111 are fixedly connected by welding, pasting, or the like. Alternatively, the first limiting member 130 and the front housing 111 are integrally formed, as long as the first limiting member 130 is located on the side of the first sliding portion 164 away from the rear surface.

In other embodiments, the first elastic member 170 is located on the side of the first sliding portion 164 facing the front housing 111. One end of the first elastic member 170 abuts on the first limiting member 130, and another end of the first elastic member 170 abuts on the first sliding portion 164 to apply a first elastic force to the bracket 160. Wherein the first elastic force is a tensile force.

As shown is FIG. 3, the one or more first sliding rods are a plurality of first sliding rods 1118, the plurality of first sliding rods 1118 are arranged in parallel, a first sliding hole 1641 of the one or more first sliding holes 1641 is formed on a position of the first sliding portion 164 corresponding to each of the plurality of first sliding rod 1118, the plurality of the first sliding rods 1118 are inserted into the corresponding first sliding holes 1641 as so to be slidably connected with the first sliding portion 164.

It can be understood that the plurality of first sliding rods 1118 are slidably connected to the first sliding portion 164 of the driving rod 162. The force applied by the plurality of first sliding rods 1118 on the first sliding portion 164 distributes more uniform, and the first sliding portion 164 can smoothly slide along the plurality of first sliding rods 1118. Wherein, an included angle is formed between the distribution direction of the plurality of first sliding rod 1118 and the extending direction of the driving rod 162. Alternatively, the distribution direction of the plurality of first sliding rods 1118 extends along the extending direction of the driving rod 162.

Optionally, at least two first sliding rods 1118 are respectively sleeved with the first elastic member 170, so that the force exerted by the first elastic member 170 on the first sliding portion 164 is more evenly distributed on the first sliding portion 164. The first sliding portion 164 can slide more smoothly along the plurality of first sliding rods 1118.

Specifically, the number of the first sliding rods 1118 is three. Two of the three first sliding rods 1118 are respectively sleeved with a first elastic member 170. Wherein, the two first sliding rods 1118 sleeved with the first elastic member 170 are located on both sides of the other first sliding rod 1118, so that the elastic force exerted by the two first elastic members 170 on the first sliding portion 164 is evenly distributed on opposite sides of the first sliding portion 164.

Optionally, the first sliding portion 164 is disposed close to the second end of the bracket 160. Therefore, in a condition that the user manually applies an external force to the bracket 160, the moment of the external force at the first sliding portion 164 is small. Therefore, the friction force between the first sliding portion 164 and the first sliding rod 1118 is small, which can make the sliding portion to slide more smoothly along the first sliding rod 1118.

As shown in FIGS. 2, 4 and 6, the bracket 160 comprises a second sliding portion 165 located on a side of the first sliding portion 164 close to the first end of the bracket 160, and the second sliding portion 165 is slidably connected with the front housing 111 along a direction of the front housing 111 away from the accessory slot 1110. The bracket 160 is slidably connected to the front housing 111 through the second sliding portion 165, which can make the force distribution between the front housing 111 and the bracket 160 more uniform, and the bracket 160 slide more smoothly relative to the front housing 111.

Wherein, due to the long length of the bracket 160 itself in some application scenarios, the photography lamp 100 further comprises a second sliding rod 1121. The second sliding rod 1121 is connected to the side of the front housing 111 away from the accessory slot 1110 and extends along the front housing 111 away from the accessory slot 1110. A second sliding hole 1651 is arranged on the second sliding portion 165, and the second sliding rod 1121 is slidably installed into the second sliding hole 1651 to make the second sliding portion 165 slidably connected to the front housing 111 along the direction away from the accessory slot 1110. Wherein, the cross-sectional shape of the second sliding rod 1121 is a circle, a rectangle, etc., which is not limited here. Correspondingly, the cross-sectional shape of the second sliding hole 1651 is circular, rectangular, etc., as long as the second sliding rod 1121 can be slidably fitted with the second sliding hole 1651. The above design can reduce the deviation of the movement stroke caused by the excessively long length of the bracket 160, and make the sliding of the bracket 160 more stable and accurate.

In other embodiments, a sliding groove is provided on the side of the front housing 111 away from the accessory slot 1110 the sliding groove extends along the direction of the front housing 111 away from the accessory slot 1110, the second sliding portion 165 is slidably installed in the sliding groove to make the second sliding portion 165 slidably connected to the front housing 111 along the direction away from the accessory slot 1110.

In other embodiments, a second sliding rail (not shown in the drawings) is provided on the rear surface of the front housing 111. The second sliding rail extends along the direction of the front housing 111 away from the accessory slot 1110. The second sliding portion 165 of the driving rod 162 is slidably installed on the second sliding rail, so that the bracket 160 is connected to the front housing 111 more along the direction of the front housing 111 away from the accessory slot 1110.

As shown is FIGS. 2, 4 and 6, the photography lamp 100 further comprises a second elastic member 180, one end of the second elastic member 180 is connected to the front housing 111, and another end of the second elastic member 180 is connected to the second sliding portion 165 to apply a second elastic force to the second sliding portion 165 to make the second sliding portion 165 slide along the front housing 111 away from the accessory slot 1110.

When an external force is manually applied to the second end of the bracket 160 in the direction of the front housing 111 away from the accessory slot 1110, the driving rod 162 drives the ejector rod 150 to retract into the through-hole 1115 and avoid the clamping protrusion to facilitate the removal of the clamping protrusion from the accessory slot 1110. The second elastic force exerted by the second elastic member 180 on the second sliding portion 165 can assist the bracket 160 to drive the ejector rod 150 to slide along the front housing 111 away from the accessory slot 1110.

Wherein, the second elastic member 180 includes springs, tensile force springs, torsion springs, rubber, elastic pieces, etc., as long as a second elastic force can be applied to the second sliding portion 165 to make the second sliding portion 165 slide along the front housing 111 away from the accessory slot 1110. There is no limitation herein.

Optionally, the second elastic member 180 is located between the front housing 111 side and the second sliding portion 165. One end of the second elastic member 180 abuts on the side of front housing 111 away from the accessory slot 1110, and another end of the second elastic member 180 abuts on the second sliding portion 165 to apply a second elastic force to the second sliding portion 165. Wherein, the second elastic force exerted by the second elastic member 180 on the second sliding portion 165 is a thrust force.

Optionally, the second elastic member 180 is sleeved on the second sliding rod 1121 to make the installation of the second elastic member 180 more stable.

Figure 5:
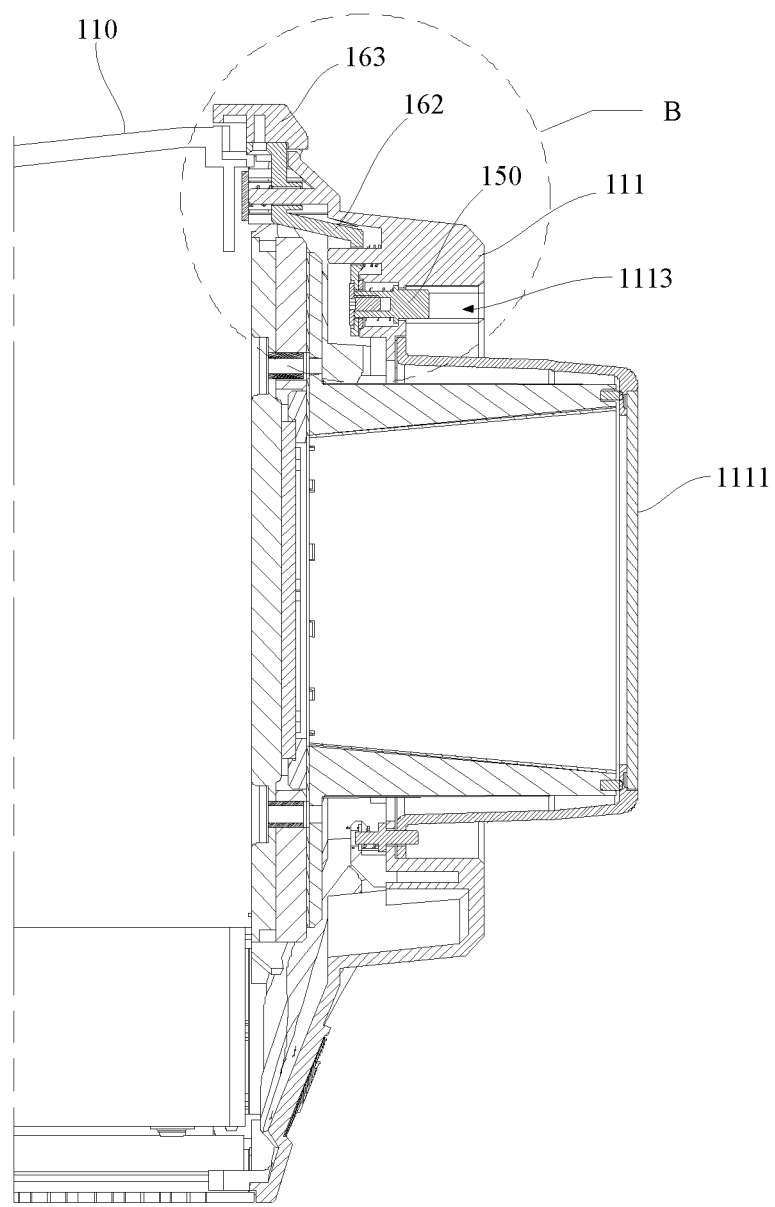
FIG. 5 is a partial cross-sectional view of the photography lamp provided by an embodiment of the present disclosure, which is a cross-sectional view along the axial direction of the photography lamp.

As shown in FIGS. 3, 5 and 6, a pushing sliding groove 1116 with an operating hole 11161 through a bottom surface is arranged on a side surface 1117 of the front housing 111. The second end of the bracket 160 is configured to passe through the operating hole 11161 and extends into the sliding groove so that the user can operate the second end of the bracket 160 more conveniently.

Wherein, the bracket 160 is provided with a driving rod 162 and a pushing portion 163 that are sequentially connected along the direction from the first end to the second end of the bracket 160, wherein the pushing prat is installed into the pushing sliding groove 1116, one end of the driving rod 162 is connected to the ejector rod 150, and another end of the driving rod 162 passes through the operating hole 11161 to connect to the pushing portion 163.

By applying an external force to the pushing portion 163 in the direction along the front housing 111 away from the accessory slot 1110, the pushing portion 163 can drive the driving rod 162 to slide along the direction of the front housing 111 away from the accessory slot 1110, therefore the ejector rod 150 is driven to slide along the front housing 111 away from the accessory slot 1110.

Optionally, the driving rod 162 is detachably connected to the pushing portion 163 to make the installation of the bracket 160 more convenient. Wherein, a clamping portion 166 is arranged on an end of the driving rod 162 away from the ejector rod 150. A clamping groove 1631 is arranged on the pushing portion 163. The clamping portion 166 is inserted into the clamping groove 1631 so that the pushing portion 163 of the driving rod 162 is detachably connected with the first sliding portion 164.

Wherein, a first fixing hole 1661 is opened on the clamping portion 166, and a second fixing hole 1632 is opened on the pushing portion 163 at a position corresponding to the first fixing hole 1661. The housing assembly 110 further includes a first fixing member (not shown in the drawings) which is inserted into the second fixing hole 1632 through the first fixing hole 1661 to connect the clamping portion 166 166 and the pushing portion 163 together. Wherein, the first fixing member is a screw.

As shown in FIGS. 2, 4 and 6, the driving rod 162 comprises a pushing rod 1621, a tilting rod 1622, and a connecting rod 1623 that are sequentially connected in a direction away from the pushing portion 163, wherein an end of the push rod away from the tilting rod 1622 is connected to the pushing portion 163, an end of the connecting rod 1623 away from the tilting rod 1622 is connected to the ejector rod 150, the tilting rod 1622 is inclinedly arranged along the direction of the front housing 111 away from the accessory slot 1110, and the pushing rod 1621 and the connecting rod 1623 are respectively bent toward opposite sides of the tilting rod 1622. Therefore, the driving rod 162 can be more adapted to the shape of the surface of the housing assembly 110 away from the accessory slot 1110, and the internal space of the housing assembly 110 occupied by the driving rod 162 can be reduced.

Wherein, the first sliding portion 164 is located on the pushing rod 1621. The second sliding portion 165 is located on the connecting rod 1623.

Optionally, the ejector rod 150 is movably connected to the bracket 160. Therefore, in a condition that the ejector rod 150 is driven to slide by the bracket 160, the position of the ejector rod 150 can be finely adjusted relative to the bracket 160 to make the ejector rod 150 to slide in the through-hole 1115 more smoothly.

Wherein, as shown is FIGS. 4 and 6, a connecting hole 1611 is arranged on the first end of the bracket 160, and the ejector rod 150 includes a free end 151 and a connecting end 152 distributed along the direction of the front housing 111 away from the accessory slot 1110. The connecting end 152 of the ejector rod 150 is inserted into the connecting hole 1611 by loose fit, so that the position of the ejector rod 150 can be finely adjusted.

The connecting end 152 of the ejector rod 150 is provided with a first limiting portion 153 located on a side of the bracket 160 away from the front housing 111, and the bracket 160 is configured to abut on the first limiting portion 153 to limit a moving distance of the ejector rod 150 relative to the bracket 160 along the front housing 111 toward the accessory slot 1110. This prevents the ejector rod 150 from sliding too far along the front housing 111 toward the accessory slot 1110 relative to a connecting portion 161 and detaching from the bracket 160.

Wherein, the first limiting portion 153 and the ejector rod 150 are detachably connected, so that the connection between the ejector rod 150 and the connecting portion 161 is more convenient. Specifically, a threaded hole is opened on the end surface of the free end 151 of the ejector rod 150, and the first limiting portion 153 includes a threaded portion. The first limiting portion 153 is configured to pass through the connecting hole 1611 from the side of the bracket 160 away from the ejector rod 150 and be inserted into the threaded hole, and the first limiting portion 153 and the ejector rod 150 are fixedly connected. By abutting the nut of a screw with the side of the bracket 160 away from the ejector rod 150, the movement distance of the ejector rod 150 relative to the bracket 160 along the front housing 111 toward the accessory slot 1110 can be restricted.

Furthermore, the photography lamp 100 further comprises a third elastic member 190, one end of the third elastic member 190 is connected to the front housing 111 and/or the bracket 160, and another end of the third elastic member 190 is connected to the ejector rod 150 to apply a third elastic force to the ejector rod 150 to make the ejector rod 150 slide along the front housing 111 toward the accessory slot 1110. The third elastic member 190 can move the ejector rod 150 to the limiting position along the direction of the front housing 111 toward the accessory slot 1110 relative to the bracket 160.

Wherein, the third elastic member 190 includes springs, tensile force springs, torsion springs, rubber, elastic pieces, etc. Furthermore, one end of the third elastic member 190 can be connected to the front housing 111 and the bracket 160, or be connected to the front housing 111 and the bracket 160 at the same time, as long as a third elastic force can be applied to the ejector rod 150 by the third elastic member 190. There is no limitation herein.

Optionally, the ejector rod 150 is provided with a second limiting portion 155. The third elastic member 190 is located on a side of the second limiting portion 155 along the direction from the free end 151 of the ejector rod 150 to the connecting end 152. One end of the third elastic member 190 abuts on the front housing 111 and/or the bracket 160, and another end of the third elastic member 190 abuts on the second limiting portion 155 to apply a third elastic force to second limiting portion 155. Wherein, the third elastic force exerted to the second limiting portion 155 of the ejector rod 150 by the third elastic member 190 is thrust force.

Wherein, a second limiting member 140 is connected to the front housing 111. The second limiting member 140 is located on the side of the second limiting portion 155 along of the front housing 111 away from the accessory slot 1110. The third elastic member 190 is located between the second limiting member 140 and the second limiting portion 155, one end of the third elastic member 190 abuts on the second limiting member 140, and another end of the third elastic member 190 abuts on the second limiting portion 155. In this way, the third elastic force exerted by the third elastic member 190 on the ejector rod 150 is more stable.

Optionally, the third elastic member 190 is sleeved on the ejector rod 150 and the installation of the third elastic member 190 is more stable. The second limiting portion 155 is protruded on an outer peripheral surface of the ejector rod 150, so that the other end of the third elastic member 190 abuts on the second limiting portion 155 more stably. Wherein, the second limiting portion 155 extends along the outer peripheral surface of the ejector rod 150 in an annular structure.

The second limiting member 140 is provided with a guide hole 141, and the ejector rod 150 is slidably connected to the second limiting member 140 through the guide hole 141, so that the ejector rod 150 can slide more stably along its length.

Optionally, the second limiting member 140 is detachably connected to the front housing 111. Specifically, a third fixing hole 142 is opened on the second limiting member 140, and a fourth fixing hole 1122 is opened on the side of the front housing 111 away from the accessory slot 1110 at a position corresponding to the third fixing hole 142. The housing assembly 110 further includes a second fixing member (not shown in the drawings) which is inserted into the fourth fixing hole 1122 through the third fixing hole 142 to connect the second limiting member 140 and the front housing 111 together. Wherein, the second fixing member is a screw. Wherein, the fixation of the ejector rod 150 and the third elastic member 190 is achieved by configuring the second limiting member 140, and a space in which the ejector rod 150 can elastically slide relative to the third elastic member 190 is formed by the second limiting member 140 and the front housing 111.

In some embodiments, an operation process of the photography lamp 100 of the present disclosure can be understood as following: in a condition that the photography lamp 100 is not provided with accessories such as a standard cover, the ejector rod 150 can be protruded from the through hole by the third elastic member 190. When it is necessary to install the accessory, the accessory can overcome the elastic force of the third elastic member 190 to retract the ejector rod 150 into the through-hole 1115, and then the accessory can be rotated again to make the male connector of the accessory rotate into the bayonet 1114, and then the ejector rod 150 is pushed out of the through-hole 1115 by the third elastic member 190. When it is necessary to remove the standard cover and other accessories, the pushing portion 163 can be pressed in the direction away from the clamping groove 1631 (for example, the length of the photography lamp 100), the first sliding portion 164 will be driven to overcome the elastic force of the first elastic member 170 and slide in the first sliding rod 1118 or the position-limiting sliding groove 11121, and the connecting rod 1623 will be driven to overcome the elastic force of the second elastic member 180 and slide on the second sliding rod 1121, and then the ejector rod 150 and the third elastic member 190 are driven to move in a direction away from the clamping groove 1631 by the first limiting portion 153, the ejector rod 150 is retracted into the through-hole 1115, the accessory can be rotated and taken out. After the accessory is taken out, the elastic force of the first elastic member 170 and the second elastic member 180 is restored. Therefore, the pushing portion 163 can be reset to the starting position again. At this time, the ejector rod also protrudes from the through-hole 1115 due to the elastic force from the third elastic member 190.

The present disclosure provides a housing assembly 110. The specific structure of the housing assembly 110 refers to the above-mentioned embodiments. Since the housing assembly 110 adopts all the technical solutions of all the above-mentioned embodiments, it has at least all the beneficial effects brought by the technical solutions of the above-mentioned embodiments. It is not repeated herein.

For the specific implementation of each of the above operations, please refer to the previous embodiment, which will not be repeated here.

While the present disclosure has been described with the embodiments, it is preferable that the above embodiments should not be construed as limiting of the present disclosure. On the contrary, the present disclosure includes all the modifications and variations without departing from the spirit and scope of the present disclosure.

What is claimed is:

1. A photography lamp, comprising:
   a front housing provided with an accessory slot on a side, wherein the accessory slot is provided with a through-hole;
   an ejector rod movably arranged in the through-hole;
   a bracket arranged on another side of the front housing away from the accessory slot; and
   a limiting structure arranged on the side of the front housing where the bracket is arranged, wherein a first end of the bracket is connected to the ejector rod, a second end of the bracket extends from the accessory slot to an edge of the front housing, the limiting structure is located between the first end and the second end of the bracket and slidably connected to the bracket, and the second end of the bracket is used to receive an external force input by an user to drive the ejector rod to slide relative to the through-hole.

2. The photography lamp as claimed in claim 1, wherein the limiting structure comprises a position-limiting sliding groove, the position-limiting sliding groove extends along the front housing away from the accessory slot, a first sliding portion that matched with the position-limiting sliding groove is arranged between the first end and the second end of the bracket, the first sliding portion is slidably installed in the position-limiting sliding groove to make the limiting structure slidably connected with the bracket.

3. The photography lamp as claimed in claim 2, wherein the limiting structure comprises a plurality of protruding columns connected to the side of the front housing away from the accessory slot, the protruding columns extend along the front housing away from the accessory slot, the plurality of protruding columns are arranged in parallel, the position-limiting sliding groove is located between the plurality of protruding columns; or
   wherein the limiting structure comprises a plurality of limiting boards connected to the side of the front housing away from the accessory slot, the plurality of limiting boards extend along the front housing away from the accessory slot, and the position-limiting sliding groove is formed by enclosing via the plurality of limiting boards.

4. The photography lamp as claimed in claim 2, wherein further comprising a first elastic member, one end of the first elastic member is connected to the front housing, and another end of the first elastic member is connected to the bracket to apply a first elastic force to the bracket to make the bracket to slide along the front housing toward the accessory slot.

5. The photography lamp as claimed in claim 4, wherein the limiting structure comprises one or more first sliding rods, an end of at least one of the one or more first sliding rods is connected to the side of the front housing away from the accessory slot, and at least one of the one or more first sliding rods extends along the front housing away from the accessory slot, wherein at least one first sliding hole is arranged on the first sliding portion, at least one of the one or more first sliding rods is inserted into a corresponding first sliding hole of the at least one sliding hole and slidably connected with the first sliding portion.

6. The photography lamp as claimed in claim 4, wherein a first limiting member is arranged on the front housing, and the first limiting member is located at a side of the first sliding portion away from the front housing, wherein the first elastic member is located between the first sliding portion and the first limiting member, one end of the first elastic member abuts on the first limiting member, and another end of the first elastic member abuts on the first sliding portion.

7. The photography lamp as claimed in claim 6, wherein the one or more first sliding rods are a plurality of first sliding rods, the plurality of first sliding rods are arranged in parallel, a first sliding hole of the one or more first sliding hole is formed on a position of the first sliding portion corresponding to each of the plurality of first sliding rods, the plurality of the first sliding rods are inserted into the corresponding first sliding hole as so to be slidably connected with the first sliding portion, and at least two of the plurality of first sliding rods are respectively sleeved with corresponding first elastic members;
   wherein the plurality of first sliding rods are provided by passing through a corresponding first sliding hole of the plurality of first sliding holes and protruding from a side of the first sliding portion facing to the first limiting member, and the first elastic member is sleeved on a corresponding first sliding rod of the plurality of first sliding rods.

8. The photography lamp as claimed in claim 2, wherein the bracket comprises a second sliding portion located on a side of the first sliding portion close to the first end of the bracket, and the second sliding portion is slidably connected with the front housing along a direction of the front housing away from the accessory slot;
   wherein the photography lamp further comprises a second elastic member, one end of the second elastic member is connected to the front housing, and another end of the second elastic member is connected to the second sliding portion to apply a second elastic force to the second sliding portion to make the second sliding portion slide along the front housing away from the accessory slot.

9. The photography lamp as claimed in claim 8, wherein further comprising a second sliding rod connected to the side of the front housing away from the accessory slot, and the second sliding rod extends along the front housing away from the accessory slot, wherein a second sliding hole is arranged on the second sliding portion and the second sliding rod is slidably installed into the second sliding hole to make the second sliding portion slidably connected to the front housing along the direction away from the accessory slot; or
   wherein a sliding groove is provided on the side of the front housing away from the accessory slot, the sliding groove extends along the direction of the front housing away from the accessory slot, the second sliding portion is slidably installed in the sliding groove to enable the second sliding portion to be slidably connected to the front housing along the direction away from the accessory slot.

10. The photography lamp as claimed in claim 1, wherein a connecting hole is arranged on the first end of the bracket, the ejector rod comprises a free end and a connecting end distributed along the direction of the front housing away from the accessory slot, the connecting end of the ejector rod is inserted into the connecting hole by loose fit, and the connecting end of the ejector rod is provided with a first limiting portion located on a side of the bracket away from the front housing, and the bracket is configured to abut on the first limiting portion to limit a moving distance of the ejector rod relative to the bracket along the front housing toward the accessory slot;
   wherein photography lamp further comprises a third elastic member, one end of the third elastic member is connected to the front housing and/or the bracket, and another end of the third elastic member is connected to the ejector rod to apply a third elastic force to the ejector rod to make the ejector rod slide along the front housing toward the accessory slot.

11. The photography lamp as claimed in claim 10, wherein a second limiting member is connected to the front housing, the ejector rod is provided with a second limiting portion, the second limiting member is located on the side of the second limiting portion along the front housing away from the accessory slot, the third elastic member is located between the second limiting member and the second limiting portion, one end of the third elastic member abuts on the second limiting member, and another end of the third elastic member abuts on the second limiting portion;
   wherein the second limiting portion is protruded on an outer peripheral surface of the ejector rod, and the third elastic member is sleeved on the ejector rod.

12. The photography lamp as claimed in claim 1, wherein a pushing sliding groove with an operating hole penetrating through a bottom surface is arranged on a side surface of the front housing, and the bracket is provided with a driving rod and a pushing portion that are sequentially connected along the direction from the first end to the second end of the bracket, wherein the pushing portion is installed into the pushing sliding groove, one end of the driving rod is connected to the ejector rod, and another end of the driving rod passes through the operating hole to connect to the pushing portion.

13. The photography lamp as claimed in claim 12, wherein the driving rod comprises a pushing rod, a tilting rod, and a connecting rod that are sequentially connected in a direction away from the pushing portion, wherein an end of the push rod away from the tilting rod is connected to the pushing portion, an end of the connecting rod away from the tilting rod is connected to the ejector rod, the tilting rod is inclinedly arranged along the direction of the front housing away from the accessory slot, and the pushing rod and the connecting rod are respectively bent toward opposite sides of the tilting rod.

* * * * *